United States Patent [19]

Fredriksson et al.

[11] Patent Number: 4,964,733
[45] Date of Patent: * Oct. 23, 1990

[54] METHOD OF AND MEANS FOR HYDRODYNAMIC MIXING

[75] Inventors: Borje Fredriksson, Dalton, Mass.; Jeffery L. Chamberlin, Lebanon Springs, N.Y.

[73] Assignee: Beloit Corporation, Beloit, Wis.

[*] Notice: The portion of the term of this patent subsequent to Aug. 29, 2006 has been disclaimed.

[21] Appl. No.: 386,743

[22] Filed: Jul. 27, 1989

Related U.S. Application Data

[62] Division of Ser. No. 898,475, Aug. 20, 1986, Pat. No. 4,861,165.

[51] Int. Cl.$^5$ ............ B01F 5/06; B01F 3/04; B01D 43/00; B03D 1/02
[52] U.S. Cl. .................. 366/336; 138/44; 209/170; 210/221.2; 210/703; 261/76; 366/165
[58] Field of Search ........... 366/336, 338, 340, 165, 366/101, 107; 138/37, 38, 44; 162/4, 65, 380; 210/703, 704, 221.2; 261/121.1, 79.2, 76, 77, 123, DIG. 75

[56] References Cited

U.S. PATENT DOCUMENTS

| | | | |
|---|---|---|---|
| 1,776,741 | 10/1930 | Schwab | 138/440 |
| 3,526,391 | 10/1970 | Church, Jr. | 366/340 |
| 3,702,144 | 11/1972 | Loveland | 138/44 |
| 3,809,240 | 5/1974 | Savall | |
| 3,995,663 | 12/1976 | Perry | 138/38 |
| 4,087,862 | 5/1978 | Tsien | 366/340 |
| 4,092,013 | 5/1978 | Staaf | 366/336 |
| 4,124,309 | 11/1978 | Yao | 366/340 |
| 4,175,873 | 11/1979 | Iwako et al. | 366/165 |
| 4,548,673 | 10/1985 | Nanda et al. | 210/221.2 X |
| 4,560,474 | 12/1985 | Holik | 210/221.2 |
| 4,861,165 | 8/1989 | Fredriksson et al. | 366/165 |

FOREIGN PATENT DOCUMENTS

| | | | |
|---|---|---|---|
| 2430487 | 8/1975 | Fed. Rep. of Germany | 366/340 |
| 3245847 | 8/1984 | Fed. Rep. of Germany | . |
| 3529638 | 7/1986 | Fed. Rep. of Germany | . |
| 581493 | 11/1976 | Switzerland | . |

Primary Examiner—Harvey C. Hornsby
Assistant Examiner—Scott J. Haugland
Attorney, Agent, or Firm—Dirk J. Veneman; Raymond W. Campbell

[57] ABSTRACT

A plurality of fluent substances are combined in a distributor (11, 37) and caused to flow in a continuous, pressurized stream through a mixing zone (13, 13', 57) wherein the substances are intimately mixed by turbulent dispersion effected by a series of conically shaped surfaces (24, 27; 62, 64) and alternate restrictions (25, 63) and expansion chambers (28, 65). While various fluent substances may be advantageously mixed, a typical utility is for effecting a thorough air binding of ink particles to attain efficient foaming (29) in the deinking of reconstituted printed paper slurry.

6 Claims, 3 Drawing Sheets

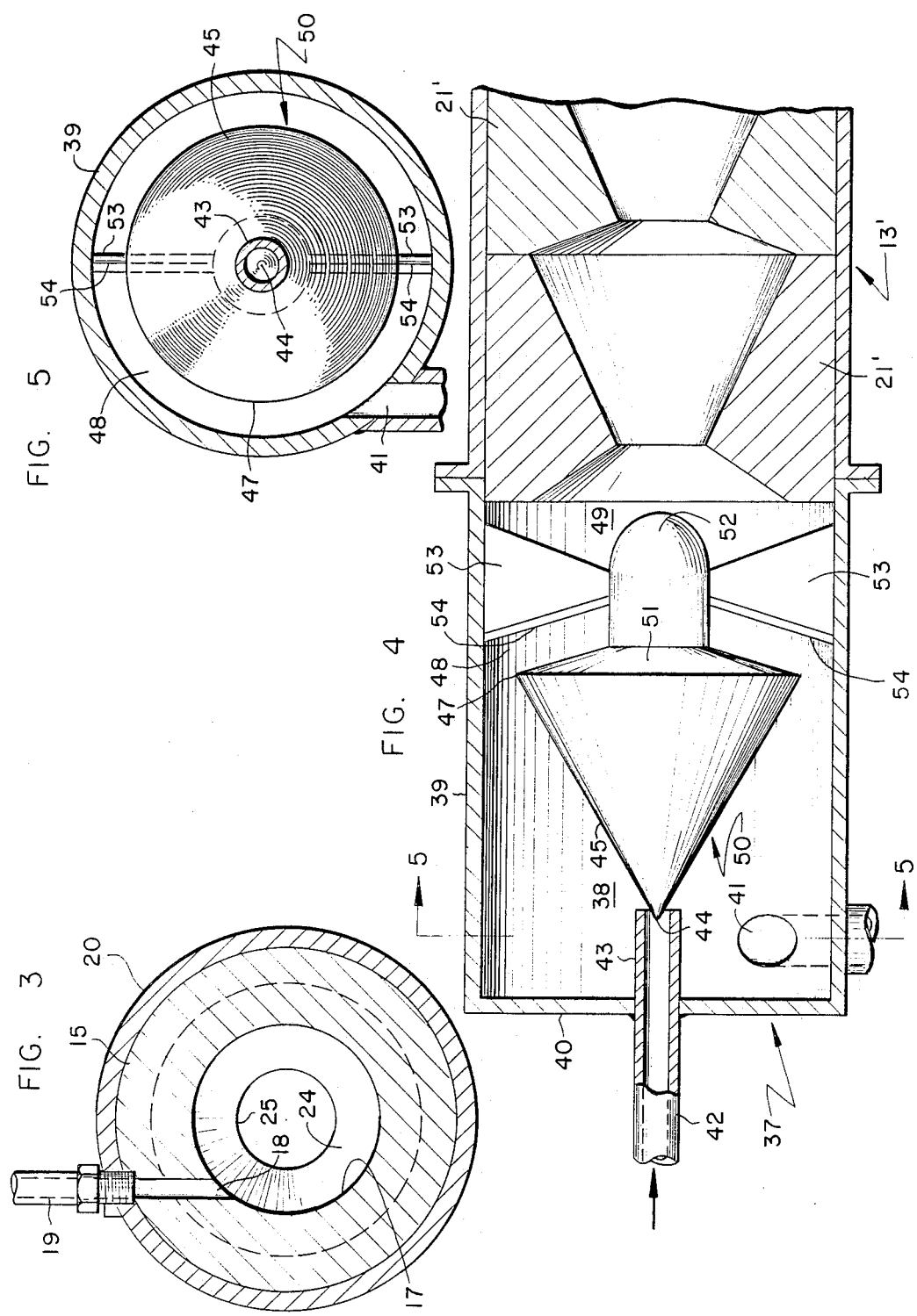

METHOD OF AND MEANS FOR HYDRODYNAMIC MIXING

This is a divisional of copending application Ser. No. 898,475, filed Aug. 20, 1986, now U.S. Pat. No. 4,861,165.

DESCRIPTION

This invention relates to hydrodynamic mixing and is more particularly concerned with mixing of a plurality of fluent substances which are required to be combined into an intimate mixture for a processing system, such as, but not limited to, paper making where one of the substances may be fibrous stock in a slurry and another of the substances may be gaseous finely particulate material which must be intimately mixed with the fibrous stock.

By way of example, a considerable problem has been encountered in attaining efficient, uniform results in deinking reconstituted printed paper slurry. Such deinking can be effected by intimately mixing air in the slurry and allowing air bubbles to engage with as many ink particles as possible. The ink particles attached to the air bubbles are subsequently separated in a floatation cell where the air bubbles carry the ink to the surface and the ink is removed with the foam that develops on the surface.

In order to enhance the mixing, it is important to have an even distribution of air into the fiber suspension even before the mixing starts. The purpose of the mixing is to increase the probabity for the air bubbles to meet and pick up ink particles.

Turbulence for mixing the air in the slurry has heretofore been effected by means of a plurality of perforated disks in the air/slurry stream. While this arrangement has functioned adequately in some situations, when long fibers are present in the slurry, clogging tends to result around the disks. Furthermore, while turbulence was created immediately around each disk, and since the area between disks created no influence on the flow, the turbulence had a tendency to decay significantly before the flow reached the next disk. The fibers in the stock tend to reinforce laminar flow, thus inhibiting mixing and further enhancing decay of turbulence. Stalling or slowdown of the stream has resulted in agglomeration of the air bubbles.

Any screens in the system, such as may be employed at the point where the air is added to the slurry, tend to clog and thus diminish efficiency.

In another example where intimate mixing of one fluent substance with another fluent substance is necessary is in bleaching operations wherein gases, such as oxygen and ozone, are mixed with fluent material such as paper making stock. It will be evident that in order to attain efficient results, the bleaching substances and the substances to be bleached must be uniformly intimately mixed.

An important object of the present invention is to overcome the disadvantages, drawbacks, inefficiencies, limitations, shortcomings and problems inherent in the prior expedients for mixing, and maintaining mixed, fluent substances in a continuous flow system.

Another object of the invention is to provide a new and improved method and apparatus for attaining intimate mixing of flowing gaseous and particulate substances with a liquid.

A further object of the invention is to provide a new and improved method of and means especially suitable for attaining efficient turbulent aeration of recycled ink-containing paper making fibrous slurry previous to a stage for removal of the ink particles carried by air bubbles.

Still another object of the invention is to provide a new and improved method of and means for thoroughly and evenly aerating paper making slurry in a continuous flow processing system.

An additional object of the present invention is to provide a mixing device which exerts continuous influence on the flow stream, thereby eliminating the tendency for decay of turbulence heretofore experienced with fibrous stock.

A still further object of the present invention is to provide a mixing device which creates highly turbulent mixing in a smooth, continuous, efficient manner.

Yet another object of the present invention is to provide a mixing device which generates three-dimensional mixing.

Pursuant to the principles of the present invention there is provided a method of attaining an intimate mixture of a plurality of fluent substances in a continuous flowthrough passage having an entry end and a discharge end, and comprising combining the plurality of fluent substances at the entry end in a continuously flowing stream filling the flowthrough passage under substantial hydrodynamic pressure, subjecting the stream in the passage to the turbulence and substance dispersing effect of a series of alternating radially inwardly tapering relatively short conically shaped turbulence surfaces and radially outwardly flaring longer conically shaped turbulence surfaces, effecting abrupt turbulent transition of the stream from one of the surfaces to the next of the surfaces in the series, thereby attaining progressively more thorough dispersion and mixing of the substances in the continuously flowing stream from the entry end to the discharge end of the passage, and discharging the thus treated stream from the discharge end of the passage to receiving means.

There is also provided a new and improved apparatus for practicing the method. The apparatus includes a distributor for combining fluent substances into a stream under substantial hydrodynamic pressure. A mixing zone in the apparatus receives the combined substances stream and is essentially open with regular smooth turbulence effecting surfaces, with no fiber catching areas, and is arranged to exert a continuous and progressive dispersing and mixing turbulence in the flow pattern of the stream Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure, and in which:

FIG. 3 is a sectional detail view taken substantially along the line III—III in FIG. 2;

FIG. 4 is a fragmentary vertical sectional detail view similar to FIG. 2, but showing a modification of the distributor at the entry end of the mixing zone passage of the apparatus;

FIG. 5 is a transverse sectional view taken substantially along the line V—V in FIG. 4.

Figures 1, 2:
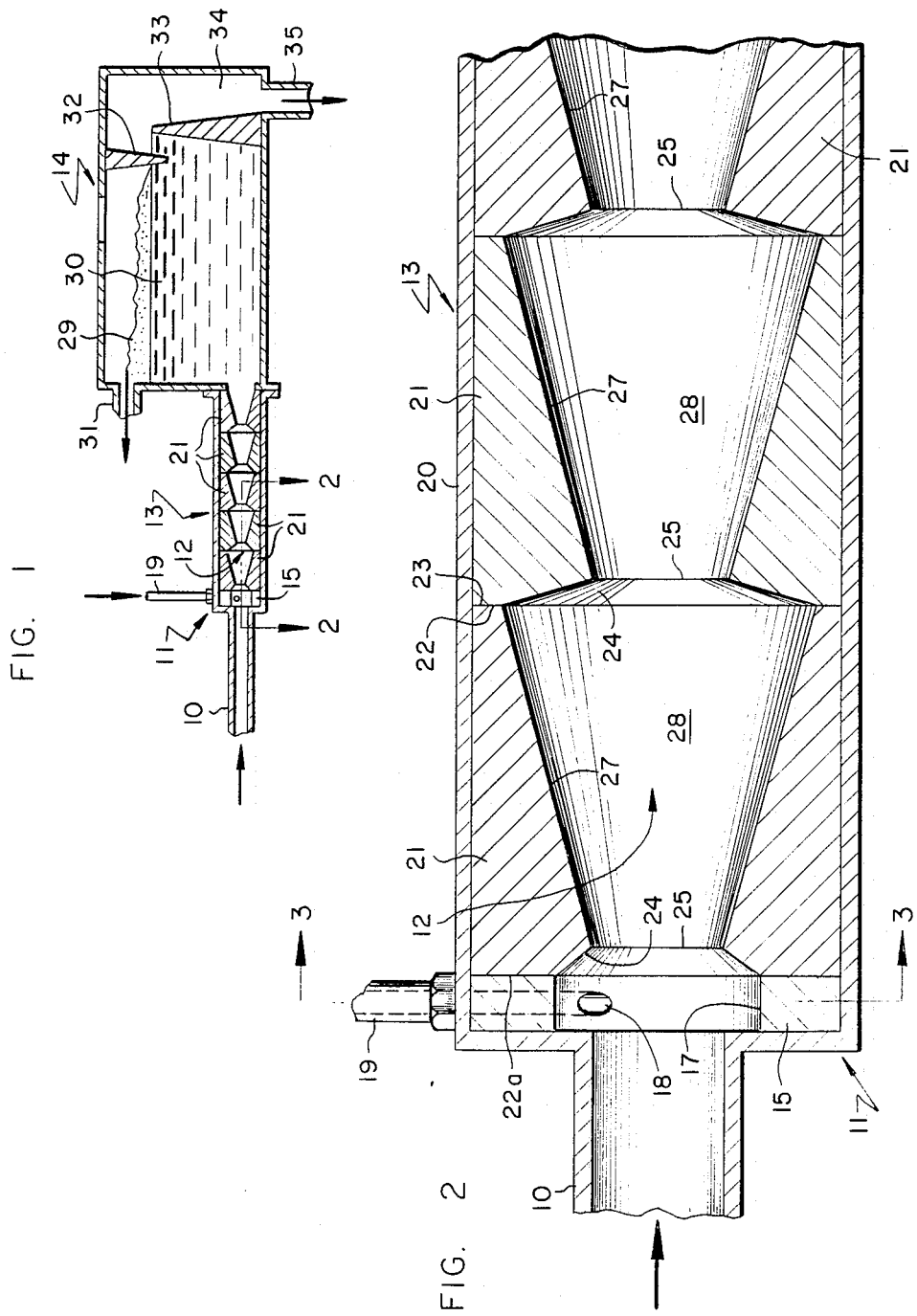
FIG. 1 is a schematic illustration wherein the present invention is embodied in a system for deinking reconstituted printed paper slurry.
FIG. 2 is an enlarged fragmentary sectional detail view taken substantially along the line II—II in FIG. 1.
Figure 6:
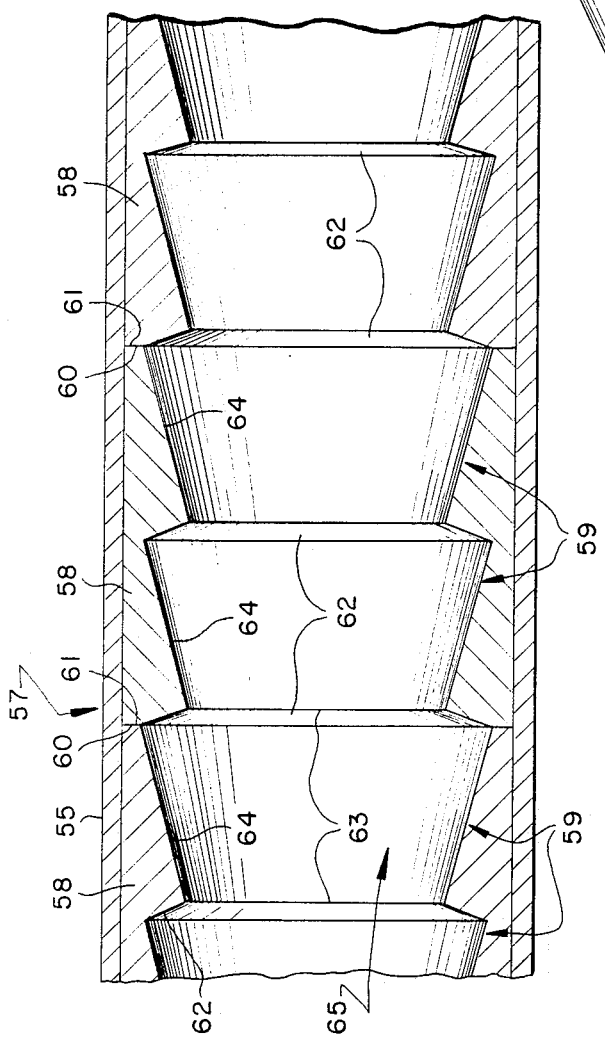
FIGS. 6 and 7 disclose a modified construction of the turbulence modules for the mixing zone of the apparatus.
Figure 7:
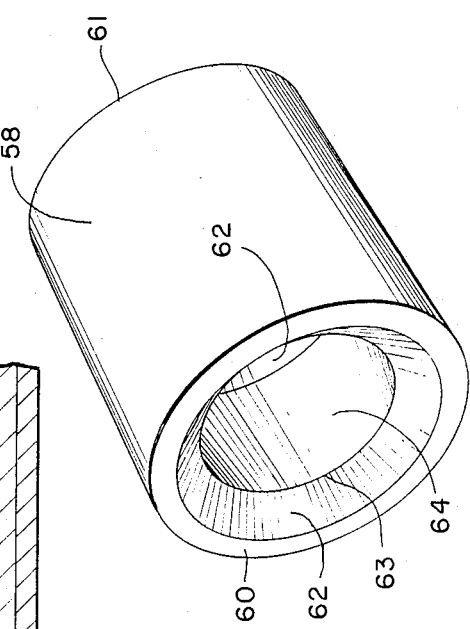

A processing system is schematically shown in FIG. 1, which is especially adapted for deinking a reconstituted printed paper fiber stock slurry for making fresh paper. A continuous stream of the slurry is delivered through a supply pipe 10 into an air distributor 11 located at the upstream or entry end of a flowthrough passage 12 extending through means defining a mixing zone 13. At its downstream or discharge end, the passage 12 discharges into an air separation cell 14.

In one preferred construction, the distributor 11 comprises a ring shaped member 15 (FIGS. 2 and 3) providing a central circular aerator or combining chamber 17 into which a fluent substance such as a slurry of paper making stock is delivered axially by the supply pipe 10. The other fluent substance, such as air or any other desired gas or fluid, to be mixed with the slurry supplied through the pipe 10, is injected into the chamber 17 generally tangentially at the cylindrical inner diameter of the ring 15 through a port 18 to which is connected a delivery line 19. Thereby, the substance delivered by the line 19 is injected in an even distribution into the chamber 17 and swirls about and into the stream of material entering the chamber 17 from the pipe 10.

From the combining chamber 17, the comingled gas, i.e., air, and slurry stream enters the passage 12 in a continuous flow filling the passage under substantial hydrodynamic pressure. As the stream enters and travels through the mixing zone 13, the stream is subjected to repeated and progressively effective substance dispersion and mixing. In a preferred arrangement for this purpose, the mixing zone 13 is housed within an elongated cylindrical tubular casing 20 to the upstream or entry end of which the supply pipe 10 is attached in any suitable manner, either integrally as shown in FIG. 2, or by means of any other appropriate hydraulic connection.

Housed within the mixing zone 13 portion of the casing 20 are means comprising a series of mixing modules 21 in end-to-end cooperation. Each of the modules 21 is desirably of a substantially standardized construction and comprises a cylindrical body which may be slidably received within the casing 20. This permits the modules 21 to be easily interchangeably assembled within the casing 21 and to be replaced whenever desired. Each module 21 has an upstream end provided with a narrow annular axially facing outer diameter abutment shoulder 22 which is engaged in the assembly with a complementary oppositely axially facing abutment shoulder 23 at the downstream end of a companion module 21. In other words, each of the modules 21 has an upstream end abutment shoulder 22 and a downstream end abutment shoulder 23. In order to accommodate and match with the engaged surface of the distributor ring 15, the upstream end, or first, module 21 in the series has an upstream end abutment shoulder surface 22a which may be wider than the corresponding shoulder surfaces 22 of the remaining modules 21.

Extending from the radially inner edge of the upstream end shoulder 21 of each of the modules 21 is an annular frustoconical generally radially and axially inwardly extending, relatively narrow, funnel-like turbulence surface 24 terminating at an abrupt transition edge 25 at the upstream edge of a substantially longer generally axially and radially outwardly extending conically shaped, i.e., frustoconical, surface 27 which extends to the downstream end shoulder 23 of the module 21.

In one preferred construction, where the outside diameter of the module 21 has been about 75 mm, desirable dimensions for the surface 24 have been about 68 mm in the major or outside diameter and about 30 mm in the minor diameter at the abrupt transition or restriction edge 25. A shallow diagonal angle of about 15° in the surface 24 relative to the diameter of the module 21 has been found desirable. Where the length of the module 21 is about 75 mm a shallow cone angle of about 15° relative to the cone axis for the surface 27 has been found desirable. The relative length of the surfaces 24 and 27 may be about one to four. At the abrupt juncture 25, the surfaces 24 and 27 are related in substantially right angular relationship. The right angular relationship is also apparent where the widest end of the surfaces 27 join the widest end of the surfaces 24. The arrangement is such that the area of a chamber 28 within each of the modules 21 progressively increases from the narrow flow restriction entrance at the restriction edge 25 to an about five times larger cross sectional flow area in the maximum cross sectional area at the exit end of the chamber 28. While the five times larger flow area ratio at the exit end of the chamber relative to the entrance end at the restriction is preferred for certain types of paper making stock of a given consistency, such ratio may be from two to one up to eight to one, depending upon the type of stock and especially the stock consistency because the consistency controls the fiber network strength and thus the power required to break up the fiber network, i.e., create turbulent mixing by fluidization.

As will be observed, there are no surfaces throughout the length of the passage 12 within the mixing zone 13 on which fibers would tend to hang up or be retarded in movement with the stream. Therefore, although the fibers in the stream, such as the reconstituted paper stock fibers referred to, might tend to reinforce flow and thus inhibit mixing, it has been found that the arrangement of abrupt restriction followed by a gradual expansion leading to another abrupt restriction creates a highly turbulent flow without standing eddies or other undesirable flow patterns.

In operation of the mixing zone 13, the stream of combined fluent substances entering the mixing zone 13 from the distributor chamber 17 is continuously influenced by the modules and is repeatedly subjected to a substance mixing three-dimensional turbulence as the stream progresses through the mixing zone, attaining progressively more thorough dispersion and mixing of the substances in the continuously flowing stream in the passage 12. At the discharge end of the passage 12, the material is discharged into the flotation unit 14 as a uniform mixture.

Tracing the progress of the stream through the mixing zone 13, at the entry end the material from the distributor 11 is subjected to the mixing action of an initial agitation on striking the first turbulence surface 24 then accelerated on passing the first abrupt restriction edge 25, followed by turbulent pressure drop in the chamber 28 of the first mixing module 21 in the series. This vigorous mixing action is repeated as the stream flows through each of the successive modules 21, efficiently reaching a high degree of uniformity in the mixture by the time the mixture leaves the mixing zone 13. Inasmuch as turbulence is generated without using extremely narrow restrictions or obstructions, clogging by fibers of the stock in the stream is not a problem. The pipe-like shape generates severe turbulence in three dimensions and makes the mixer surfaces self-cleaning.

Depending upon the nature of the fluent substances to be mixed, there may be any desired plurality of the mixing modules 21 in the series, five modules being shown for attaining a high degree of mixing of air or other gas with a slurry which requires multiple agitations in successive turbulence stages throughout the mixing zone for attainment of the desired mixture uniformity. At each agitation or turbulence stage as the stream progresses through the mixing zone 13, there is a progressively more intimate mixing of the substances, e.g., air and fibers, in the rapidly flowing stream. Mixing is promoted by the stream striking each of the turbulence wall surfaces 24 and thereby breaking up any tendency toward channeling, in spite of the flow reinforcing tendencies of the fibers, and also promoting subturbulence, as the stream is diverted toward the restriction 25. In the stream velocity through the restriction 25 and the abrupt transition to the flaring surface 27 and pressure drop and controlled uniform expansion toward the maximum area of the chamber 28, turbulent mixing progresses in each module 21. As the turbulence and mixing cycle is aggressively repeated in each stage in the mixing zone 13, the mixture reaches maximum yield at final discharge into the receiving chamber of the separation cell 14 wherein air bubbles with ink attached rise as a foam 29 to the surface of the body of agitated slurry 30. A vacuum drawoff 31 removes the ink laden foam 29. The velocity of entry of the thoroughly mixed air and slurry into the cell 14 is controlled to assure that as a result of the boyancy force and liquid velocity. the ink carrying bubbles will be efficiently drawn off in the foam 29. The cleaned fiber slurry flows past a foam baffle 32 and spills over a dam 33 into a discharge chamber 34 from which a drain pipe 35 carries the slurry to a further processing point or to another deinking stage if necessary, screening, or other processing as may be desired.

For some purposes a distributor 37 as shown in FIGS. 4 and 5 may be desirable. In this arrangement, a plurality of fluent substances is combined in a continuously flowing stream completely filling a flowthrough chamber 38 within a cylindrical elongated housing 39 having an end closure 40 at the upstream or entry end of the chamber 38. Adjacent to the closure 40, an inlet 41 discharges preferably the heavier of the substances to be mixed, such as paper making stock slurry, tangentially through the wall of the housing 39 into the maximum cross sectional full volume area of the chamber 38. Axially through the end closure 40, an inlet pipe 42 provides a nozzle 43 by which another substance such as air or any other desired gas or substance is injected axially into the chamber 38. Centered in the discharge port of the nozzle 43 is a tip 44 of a flaring conical surface 45 along which a conical film or layer of the substance from the nozzle 43 travels enveloped in the generally spirally moving stream of the substance which has been delivered by the inlet 44 into the chamber 38. The combined streams flow in spiral fashion downstream along the flaring surface 45 to an annular abrupt transition edge 47 defining with the housing wall 39 a venturi orifice 48. At the venturi orifice 48, the substance traveling along the surface 45 is driven at high velocity into the substance in the stream which has been delivered into the chamber 38 through the inlet 41. At the downstream end of the orifice 48, the combined stream is turbulently ejected with efficient substance-mixing effect into a space 49 connected with the upstream end of a mixing zone 13' which is similar to the mixing zone 13 of FIG. 2, into which the turbulently moving stream is delivered in essentially the same manner as the combined stream is delivered from the comingling chamber 17 in FIG. 2. Within the mixing zone 13', the modules 21' may, if preferred, be shorter, as shown, but in other respects substantially the same as the modules 21 in FIG. 2.

In a desirable construction, the conically shaped surface 45 may be provided on a conical member 50 having a radially and axially inwardly tapered downstream end surface 51 joining a central bullet nose stem 52 projecting in downstream direction and attached to means such as a radially outwardly extending supporting fin structure 53 provided with generally upstream knife edges 54, sloping generally radially and axially inwardly substantially parallel to the surface 51, and located in the area of the space 49 which receives the mixture stream in its most turbulently agitated condition downstream adjacent to the orifice 48. Freedom from hangup of fibrous material is thereby assured.

For some mixtures, shorter turbulence promoting stages of larger number may be desirable. This may be effected by having the individual modules shorter as shown in FIG. 4 for a given length of mixing zone. On the other hand, a cylindrical tubular housing 55 similar to the described housing 20, may define a mixing zone 57 having therein a series of turbulence generating modules 58 each of which may be of about the same length as the modules 21 in FIG. 2, but each being of multistage structure and having, as shown but not limited to, two turbulence generating stages 59. At their upstream and downstream ends, the dual modules 58 have respective axially facing annular surfaces 60 and 61 which abut the respective opposing end surfaces of the contiguous modules 58 in the series. Each of the stages 59 has a relatively short radially inwardly and axially downstream slanted generally conical turbulence surface 62 joining on an abrupt restriction edge 63 a relatively longer generally conical radially outwardly and downstream flairing turbulence surface 64 of desirably about the same angularity as the surfaces 24 and 27, but respectively shorter than those surfaces. The diameter of the restrictions 63 is substantially greater than the restrictions 25 and, the minimum diameter of a through passage 65 in the mixing zone 57 is greater than the minimum diameter of the through passage 12. The downstream end of each of chambers 67 in the module sections 59 may be of the same diameter as the downstream end of the chambers 28.

Since the geometrical configuration of the modules 58 is substantially the same as the modules 21, but in a plural mode, the stream agitating turbulence effect in the multiple stages 59 along the modules 58 occurs substantially the same as described for the modules 21, but with increased frequency, and with possibly less intensity where that is permissible for a given hydrodynamic pressure. However, mixing intensity may be compensated for, where desired, by increased velocity in the stream through the passage 65.

By virtue of the smooth, circular surfaces and their cooperation in the mixing zones 13, 13' and 57 provided by the present invention, even where some of the surfaces are relatively abrupt, there is attained not only assured intimate mixing of substances in the hydrodynamic streams of material in the passages through the mixing zones, but also freedom from pocketing or fiber hang up of the flowing material. It may also be noted that the mixing zones are free from moving parts, and are of modular construction providing for simplicity not only for manufacturing convenience, but also for ease and convenience of assembly and changing or replacement of the mixing modules for any desired changes in mixing intensities. This contributes in the present invention to a method and means of high efficiency and low cost.

Although use of the present invention in connection with deinking reconstituted paper slurry has been selected as a principal example, other uses will be obvious. For example, the invention may be used for pulp slurry deflocculation ahead of a head box in a paper making machine. Other types of mixing may also be effected, such as mixing different types of pulp slurries, mixing pulps and chemicals, and the like.

It will be understood that variations and modifications may be effected without departing from the spirit and scope of the novel concepts of the present invention.

We claim:

1. Apparatus for attaining an intimate mixture of a plurality of fluent substances in a continuous flow-through passage having an entry end and a discharge end, comprising:
   means for combining said plurality of fluent substances at said entry end in a continuously flowing stream filling said flow-through passage under substantial hydrodynamic pressure;
   means for subjecting said stream in said passage to substantially continuous turbulence and dispersion with mixing effect, and comprising a series of immediately adjacent alternating radially inwardly tapering relatively short conical turbulence surfaces and radially outwardly flaring relatively longer generally conical turbulence surfaces;
   means for effecting abrupt transition of the stream from each of said surfaces to the next of said surfaces throughout the entire length of said series;
   said surfaces and said abrupt transition means cooperating for attaining continuous and progressively thorough dispersion and mixing of said substances in the continuously flowing stream from said entry end to said discharge end of said passage; and
   said discharge end being arranged for discharging the treated stream to receiving means.

2. Apparatus according to claim 1, wherein said combining means comprises means for supplying one of said substances as a fibrous paper and making slurry and means combining another of said substances as a gas with said slurrly.

3. Apparatus according to claim 2, wherein said slurry comprises reconstituted printed paper, and said gas combining means supplies air to said slurry for attaching to ink particles as a result of said dispersion and mixing.

4. Apparatus according to claim 3, wherein said passage discharges the treated stream into an ink separation cell.

5. An apparatus for obtaining an intimate mixture of a plurality of combined fluent substances supplied to said apparatus under substantial hydrodynamic pressure, said apparatus comprising a series of mixing modules defining a continuous, flow-through passage in which mixing occurs; said passage including a series of alternating radially inwardly tapering, relatively short conical surfaces and radially outwardly flaring, relatively longer conical surfaces; and abrupt transition edges between adjacent inwardly and outwardly tapering surfaces such that fluid passing therethrough is subjected continously to the effects of dispersion from said outwardly tapering surfaces or acceleration from said inwardly tapering surfaces throughout the length of said passage.

6. An apparatus as defined in claim 5, and further comprising an outer tube for holding said modules, and said modules being discrete pieces placed in end-to-end relationship in said outer tube.

* * * * *